United States Patent [19]
Logan

[11] Patent Number: 5,848,720
[45] Date of Patent: Dec. 15, 1998

[54] UNIBODY FUEL TANK SYSTEM

[75] Inventor: Dan T. Logan, Fremont, Ind.

[73] Assignee: Navistar International Transportation Corp, Chicago, Ill.

[21] Appl. No.: 725,867

[22] Filed: Oct. 4, 1996

[51] Int. Cl.⁶ .................................................. B65D 88/12
[52] U.S. Cl. ...................... 220/563; 220/653; 220/652; 220/668; 220/4.14
[58] Field of Search .................................... 220/562, 563, 220/651, 652, 653, 668, 905, DIG. 24, 4.14; 280/834, 833, 830

[56] References Cited

U.S. PATENT DOCUMENTS

| | | | |
|---|---|---|---|
| 961,552 | 6/1910 | Neblett | 220/652 |
| 1,316,949 | 9/1919 | Hall | 220/DIG. 24 |
| 1,394,742 | 10/1921 | Kramer | 220/563 |
| 1,443,500 | 1/1923 | Phillips | 220/653 |
| 2,214,330 | 9/1940 | Henderson et al. | 220/563 |
| 2,860,809 | 11/1958 | Perry | 220/563 |
| 4,357,027 | 11/1982 | Zeitlow | 280/5 A |
| 4,611,724 | 9/1986 | Watkins | 220/562 |

*Primary Examiner*—Stephen J. Castellano
*Attorney, Agent, or Firm*—Dennis K. Sullivan; Jeffrey P. Calfa

[57] ABSTRACT

A fuel tank system includes a fuel tank defined by an external wrapper or skin within which fuel tank reinforcing support structures are incorporated, the fuel tank support structures further incorporating a tank mounting system for producing simplified mounting of the fuel tank system to a desired portion of a frame rail of a vehicle. The unibody construction produces an enhanced, significantly elevated level of ground clearance for the fuel tank system, the clearance being defined by the bottom wall surface of the fuel tank of the system.

8 Claims, 2 Drawing Sheets

UNIBODY FUEL TANK SYSTEM

The present invention relates to a unibody fuel tank system which reduces required assembly labor, eliminates the requirement for tank straps and hanger brackets and enhances ground clearance parameters. More specifically, the system comprises a unibody tank having integral internal reinforcements which in turn support fastening members for attaching the fuel tank directly to a vehicle frame rail, such as that typically found on a truck.

THE PRIOR ART

Presently available truck fuel tanks comprise a hollow tank, which may have internal baffles for controlling fuel movement in the tank. At least two hanger straps are disposed about the outer periphery of the fuel tank and work in cooperation with an equal number of hanger brackets which are fixed to and suspended below a frame rail of a vehicle such as a truck to maintain the tank suspended from the frame rail. The suspended position of the brackets relative to the frame rail decreases the available ground clearance therebeneath. The time and labor involved in mounting the brackets to the frame rail, fixing the straps to the tank and creating an aligned cooperation between the brackets and the straps while also accommodating ground clearance requirements is, to say the least, significant. Accordingly, simplification of the process, by simplification of structural features, is desired.

SUMMARY OF THE INVENTION

A primary object of the invention is to provide a simplified tank system which dramatically reduces time and labor required for assembly.

A further object is to provide a tank system which concurrently increases ground clearance.

These as well as other objects are specifically met by the unibody fuel tank system of the present invention which comprises a rectangular or "D" shaped fuel tank wrapper within which internal support baffles are provided for maintaining the tank configuration. Each internal support baffle includes mounting structure for attaching the support baffle, and thus the fuel tank, directly to the vehicle frame rail so that the tank is quickly and simply engaged to the frame rail. The internal support baffles, which extend across the inner periphery of the tank, also provide the new function of supporting the weight of the tank as well as maintaining the shape of the tank.

BRIEF DESCRIPTION OF THE DRAWINGS

Other objects and advantages of the invention will become more apparent upon perusal of the detailed description thereof and upon inspection of the drawings in which.

DESCRIPTION OF THE PREFERRED EMBODIMENT

Figure 1:
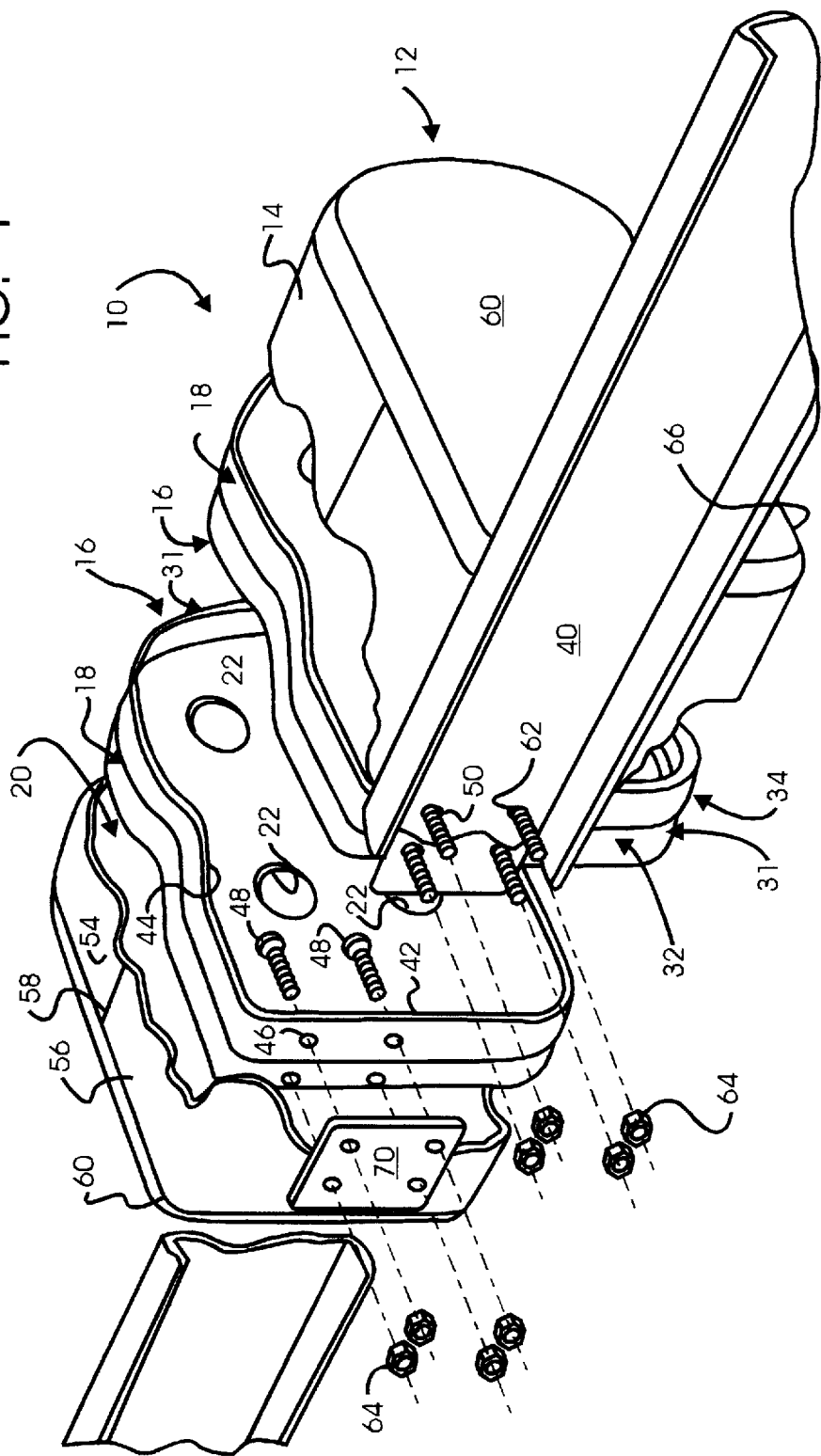
FIG. 1 is a perspective view of the fuel tank system of the present invention being engaged to a vehicle frame rail, with portions of the frame rail and portions of a wrapper of a fuel tank of the system being broken away to show details of internal tank support structures as well as details of the frame rail engaging structure of the system which is incorporated into the internal support structures.
Figure 2:
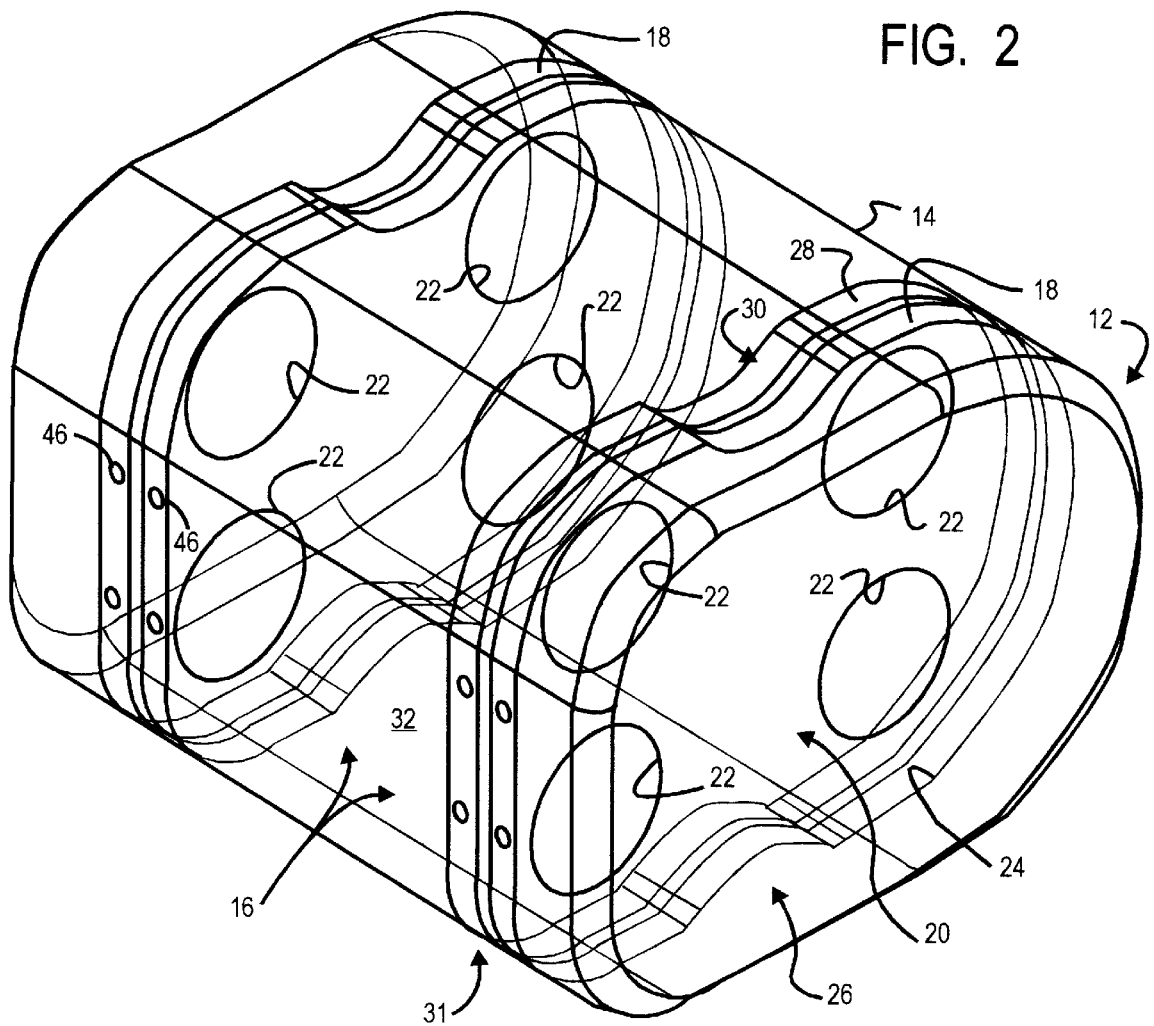
FIG. 2 is an enlarged perspective view through a wrapper (shown transparently) of the fuel tank of the system showing the configuration and placement of the internal tank support and mounting structures.

Referring now to the drawings in greater detail, there is illustrated therein a fuel tank system made in accordance with the teachings of the present invention and generally identified by the reference numeral 10.

The system 10 includes a rectangular or "D" shaped fuel tank 12, the configuration and confines of which are defined by an exterior wrapper 14. The wrapper 14 is typically made of a thin material which requires supporting structure to maintain the configuration thereof when the tank 12 is filled with fuel.

The system 10 disclosed herein incorporates an internalized support system 16 for the tank 12, such support system 16 incorporating a set of support baffles 18 which are spaced apart within the tank wrapper 14 and are configured to provide the desired rectangular or "D" cross sectional configuration for the tank 12 and also to support the weight of the tank and the fuel contained in the tank.

The wrapper 14 defines an internal fuel chamber 20 and to assure continuity of the chamber 20, the baffles 18 each include a plurality of throughports 22 therein which allow fuel to flow freely across the entire extent of the chamber 20.

Further, a bottom edge 24 of each baffle 18 is notched at 26 so that fuel at levels below the level at which the throughports 22 terminate is not trapped by the baffle 18 to one side thereof.

Also, an upper edge 28 of each baffle 18 is notched at 30 so that air within the tank 12 is not trapped by the baffles 18 and kept from escaping through a fill port (not shown) during filling of the tank 12 with fuel. Typically such fill port is positioned along an upper area of the tank 12 and a drain port (not shown) is positioned along a bottom surface of the tank 12.

Each baffle 18 includes a peripheral flange 31 which extends to each side thereof a predetermined distance, with the baffle 18 being centered relative to the lateral extend of the flange 31. The flange 31 includes a substantially planar section 32 which ultimately acts as a base for a tank engagement system 34 for the tank 12 by means of which the tank 12 is engaged to a frame rail 40.

It will be understood that the tank 12 extends laterally outwardly from a side frame rail 40 of the vehicle. When the tank 12 is filled with fuel, which has significant weight, the tank engagement system 34 engaged to the frame rail 40 is stressed and it is preferred to reinforce the planar sections 32 of each baffle 18 against any damage which may be caused by such stress. Such reinforcement for each baffle 18 is provided in the form of a pair of secondary reinforcing flanges 42, each reinforcing flange 42 resting along and being spot welded to an inner surface 44 of each planar section 32 of the peripheral flange 31, the pair of reinforcing flanges 42 being separated by the centered baffle 18 extending inwardly therebetween.

Once combined, the paired flanges 31, 42, are provided with a plurality of holes 46 extending therethrough, with the holes 46 being located to both sides of the baffle 18 in aligned pairs.

A bolt 48 is extended through each hole 46, with a threaded end 50 of the bolt 48 being directed outwardly, and each bolt 48 is then fixed in place in any suitable fashion.

The baffles 18 are now ready to be wrapped within the wrapper 14 of the tank 12. The wrapper 14 is a planar sheet of material which also has aligned pairs of holes (not shown) therein at a predefined location. The holes are located such that the threaded ends 50 of the bolts 48 extending outwardly of the baffles 18 extend therethrough when the wrapper 14 is engaged to and about the baffles 18, with cooperating ends 54 of the tank wrapper 14 being brought together and forming an upper surface 56 of the tank 12 upon welding of a seam 58. It is preferable to form the seam 58 along the upper surface 56 of the tank 12 inasmuch as the upper surface 56 encounters the least amount of stress, minimizing any potential seam leakage.

Once the tank wrapper 14 has been welded into an envelope about the baffles 18, an end cap 60 is engaged over each open end of the tank 12 and is welded to the underlying area of the tank wrapper 14.

Mounting of the completed tank system 10 now merely requires the drilling of cooperating holes 62 in the area of the frame rail 40 where the system 10 is to be mounted, with the threaded bolt ends 50 then being extended through the frame rail holes 62 and having a nut 64 engaged thereover, fixing the tank system 10 to the frame rail 40, with a bottom surface 66 of the tank 12 of the system 10 now defining a substantially enhanced (elevated) level of ground clearance thereunder rather than having ground clearance defined beneath tank supporting brackets which depend significantly below the tank presently.

If it is desired to space the tank system 10 slightly away from the frame rail 40, a planar spacer member 70 may be engaged over the bolts ends 50 at a position sandwiched between the frame rail 40 and the tank wrapper 14.

As defined above, the tank system 10 of the present invention provides a number of advantages, some of which have been described above and others of which are inherent in the invention. Also, modifications can be proposed to the tank system 10 without departing from the teachings herein. Accordingly the scope of the invention is only to be limited as necessitated by the accompanying claims.

What is claimed is:

1. A unibody fuel tank system comprising a fuel tank defining a fuel chamber and incorporating an internal reinforcing support system for the tank therein, the support system also incorporating an engagement system for directly mounting the fuel tank system to a frame rail of a vehicle;

said internal reinforcing support system comprises a pair of planar spaced apart baffles disposed perpendicularly from a first connection to a tank wall and extending across an interior of said tank to a second connection with said tank wall;

each planar baffle includes a peripheral flange;

said peripheral flange includes at least one substantially planar portion; and said substantially planar portion of said peripheral flange is reinforced by a secondary reinforcing flange, the reinforcing flange lying along and being fixed to an inwardly directed surface of said substantially planar portion of said peripheral flange.

2. A unibody fuel tank system comprising a fuel tank defining a fuel chamber and incorporating an internal reinforcing support system for the tank therein, the support system also incorporating an engagement system for directly mounting the fuel tank system to a frame rail of a vehicle;

said internal reinforcing support system comprises a pair of planar spaced apart baffles disposed perpendicularly from a first connection to a tank wall and extending across an interior of said tank to a second connection with said tank wall;

said planar baffles each include a plurality of throughport, an upper edge having a notch therein and a lower edge having a notch therein;

each planar baffle includes a peripheral flange;

said peripheral flange includes at least one substantially planar portion; and said substantially planar portion of said peripheral flange is reinforced by a secondary reinforcing flange, the reinforcing flange lying along and being fixed to an inwardly directed surface of said substantially planar portion of said peripheral flange.

3. The system of claim 2 wherein said peripheral flange extends in both directions from said planar baffle and a pair secondary reinforcing flanges engage said peripheral flange, the pair of reinforcing flanges being separated from one another by said planar baffle.

4. The system of claim 2 wherein a plurality of aligned pairs of holes are drilled into and through each reinforced substantially planar portion of said flange, one hole of each aligned pair being to one side of said planar baffle.

5. The system of claim 4 wherein a bolt having a threaded end is fixedly engaged within each drilled hole with the threaded end thereof extending outwardly of the reinforced flange exteriorly of the tank.

6. The system of claim 5 wherein the fuel tank is defined by a seamed wrapper within which said baffles are positioned and a corresponding plurality of holes is drilled into the wrapper at a predetermined position therealong such that the threaded ends of the bolts extending through the wrapper holes when the wrapper is fixed about said baffles, wherein a seam is formed between contiguous ends of said wrapper, said seam being on a top surface of said tank, and said tank further incorporating a pair of end caps.

7. The system of claim 6 wherein a corresponding plurality of holes is drilled into a vehicle frame rail at a position therealong where the fuel tank system is to be attached.

8. The system of claim 7 wherein a threaded end of each of said bolts is fed through a cooperating frame rail hole and wherein a nut is fixed to the threaded end of each bolt.

* * * * *